US006825309B2

(12) United States Patent
Morini et al.

(10) Patent No.: US 6,825,309 B2
(45) Date of Patent: Nov. 30, 2004

(54) CATALYST COMPONENTS FOR THE POLYMERIZATION OF OLEFINS

(75) Inventors: Giampiero Morini, Padua (IT); Giulio Balbontin, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 0 days.

(21) Appl. No.: 10/149,306

(22) PCT Filed: Sep. 24, 2001

(86) PCT No.: PCT/EP01/11048

§ 371 (c)(1), (2), (4) Date: Jun. 10, 2002

(87) PCT Pub. No.: WO02/30998

PCT Pub. Date: Apr. 18, 2002

(65) Prior Publication Data

US 2003/0060581 A1 Mar. 27, 2003

(30) Foreign Application Priority Data

Jan. 13, 2000 (EP) ........................................... 00203535

(51) Int. Cl.[7] ............................................. C08F 110/06

(52) U.S. Cl. .................... 526/351; 526/142; 526/124.3; 526/123.1; 526/107; 502/103; 502/115; 502/127

(58) Field of Search ................................ 526/351, 142, 526/124.3, 123.1, 107; 502/103, 115, 127

(56) References Cited

U.S. PATENT DOCUMENTS

| | | | | |
|---|---|---|---|---|
| 4,220,554 A | 9/1980 | Scatá et al. | ............. | 252/429 B |
| 4,298,718 A | 11/1981 | Mayr et al. | ................. | 526/125 |
| 4,399,054 A | 8/1983 | Ferraris et al. | ......... | 252/429 B |
| 4,469,648 A | 9/1984 | Ferraris et al. | ................ | 264/9 |
| 4,495,338 A | 1/1985 | Mayr et al. | ................. | 526/125 |
| 4,522,930 A | 6/1985 | Albizzati et al. | ........... | 502/124 |

FOREIGN PATENT DOCUMENTS

| | | | |
|---|---|---|---|
| EP | 0395083 | 10/1990 | C08F/4/02 |
| EP | 0553805 | 8/1993 | C08F/10/00 |
| EP | 0553806 | 8/1993 | C08F/10/00 |
| EP | 0601525 | 6/1994 | C08F/4/654 |
| EP | 0658577 | 6/1995 | C08F/110/06 |
| EP | 0982328 | 3/2000 | C08F/297/08 |
| WO | 9844009 | 10/1998 | C08F/4/02 |
| WO | WO 00/63261 | * 10/2000 | |
| WO | 0063261 | 10/2000 | C08F/10/00 |

OTHER PUBLICATIONS

X. King et al., "Temperature Rising Elution Fractionation of Polypropylene Produced by Ziegler–Natta Catalysts," Eur. Polymer Journal, vol. 34, No. 3/4, pp. 431–434 (1998).

P. Sobota et al., "Ionization of $TiCl_4$ and $MgCl_2$ during the Formation of a High–Activity Alpha–Olefin Polymerization Catalyst. Crystal Structures of . . . ," Inorg. Chem., vol. 35, pp. 1778–1781 (1996).

Y. Inoue et al., "Studies of the stereospecific polymerization mechanism of propylene by a modified Ziegler–Natta catalyst based on 125 MHz $^{13}C$ n.m.r. spectra," Polymer, vol. 25, pp. 1640–1644 (1984).

R. Chujo et al., "Two–site model analysis of $^{13}C$ n.m.r. of polypropylene polymerized by Ziegler–Natta catalyst with external alkoxysilane donors," Polymer, vol. 35(2) pp. 339–342 (1994).

* cited by examiner

*Primary Examiner*—Ling-Siu Choi

(57) ABSTRACT

The present invention relates to catalyst components for the polymerization of olefins comprising Mg, Ti, halogen and at least two electron donor compounds, said catalyst component being characterized by the fact that at least one of the electron donor compounds, present in an amount from 20 to 50% by mol with respect to the total amount of donors, is selected from esters of succinic acids which are not extractable, for more than 25% by mol and at least another electron donor compound which is extractable, for more than 35%. The said catalyst component are capable to give polymers with high xylene insolubility, high stereoblock content and broad MWD suitable for making the polymers usable in the BOPP sector.

19 Claims, No Drawings

CATALYST COMPONENTS FOR THE POLYMERIZATION OF OLEFINS

This application is the U.S. national phase of International Application PCT/EP01/11048, filed Sep. 24, 2001.

The present invention relates to catalyst components for the polymerization of olefins, in particular propylene, comprising a Mg dihalide based support on which are deposited a Ti compound having at least one Ti-halogen bond and at least two electron donor compounds selected from specific classes. The present invention further relates to the catalysts obtained from said components and to their use in processes for the polymerization of olefins. The catalysts of the present invention are able to give, with high yields, propylene homopolymers characterized by high xylene insolubility, a broad range of isotacticity and, in particular conditions by a very high content of stereoblocks.

Catalyst components for the stereospecific polymerization of olefins are widely known in the art. The most largely widespread family of catalyst systems comprises a solid catalyst component, constituted by a magnesium dihalide on which are supported a titanium compound and an internal electron donor compound, used in combination with an Al-alkyl compound. Conventionally however, when a higher crystallinity of the polymer is required, also an external-donor (for example an alkylalkoxysilane) is needed in order to obtain higher isotacticity. One of the preferred classes of internal donors is constituted by the esters of phthalic acid, diisobutylphthalate being the most used. This catalyst system is capable to give very good performances in terms of activity, isotacticity and xylene insolubility provided that an external electron donor compound is used. When the external donor is missing, low yields, low xylene insolubility and poor isotacticity are obtained. On the other hand, when the external donor is used, high xylene insolubility is obtained only together with a high isotacticity. Moreover, the Molecular Weight Distribution (MWD) is, under the normal single step polymerization conditions, not broad (Polydispersity Index in the range 3.6–4.5). These characteristics, although useful in certain applications, are not desirable in certain other fields such as the production of bi-oriented polypropylene films (BOPP). For application in this field in fact, polypropylenes are required to have a broad MWD (Polydispersity Index higher than 5) a lower flexural modulus (obtainable by lowering crystallinity of the polymer) while at the same time retaining a high xylene insolubility. Moreover, it has been found that suitable polymers for application in this field are those that, in addition to the above requirements, have also a comparatively high content of the so called stereoblocks, i.e., of polymer fractions which, although predominantly isotactic, contain a not negligible amount of non-isotatctic sequences of propylene units. In the conventional fractionation techniques such as the TREF (Temperature Rising Elution Temperature) those fractions are eluted at temperatures lower than those are necessary for the more isotactic fractions. In EP 658577 is described a method for producing PP homopolymers having a high stereoblock content. It comprises polymerizing propylene in the presence of a catalyst comprising (i) a solid catalyst component in which a Ti compound and diisobutyl phthalate are supported on a $MgCl_2$, (ii) an Al-alkyl compound as a co-catalyst and (iii) a 3,3,3,trifluropropyl(alkyl) dimethoxysilane as external donor. In example 1 it can be seen that although the polymerization is carried out in two sequential steps under different conditions, the MWD of the bimodal polymer obtained is not sufficiently broad (Polydispersity Index 4.7). Furthermore, the bimodal polymers can have problems of homogeneity due to presence of distinct fractions with pronounced difference in average Mw. In said example 1 the weight percentage of stereoblock fraction measured via TREF, on the polymer after visbreaking, is about 31%, while in another run (in Table 2) the amount of stereoblock fraction was about 26%. In view of the above, it would be desirable to have a catalyst component with still improved characteristics and in particular capable to give polymers with high xylene insolubility, high stereoblock content and broad MWD suitable for making the polymers usable in the BOPP sector.

It has now unexpectedly been found a catalyst component having the above advantages which comprises Mg, Ti, halogen and two electron donor compounds selected from specific classes. It is therefore an object of the present invention a catalyst component for the polymerization of olefins $CH_2{=}CHR$, in which R is hydrogen or a hydrocarbyl radical with 1–12 carbon atoms, comprising Mg, Ti, halogen and at least two electron donor compounds, said catalyst component being characterized by the fact that at least one of the electron donor compounds, which is present in an amount from 15 to 50% by mol with respect to the total amount of donors, is selected from esters of succinic acids which are not extractable, under the conditions described below, for more than 20% by mol and at least another electron donor compound which is extractable, under the same conditions, for more than 30% by mol.

According to the present invention, the esters of succinic acids not extractable for more than 20% by mol will be defined as non-extractable succinates. The electron donor compounds extractable for more than 30% by mol will be defined as extractable electron donor compounds. Preferably, the amount of non-extractable succinates is between 20 and 45 and more preferably from 22 to 40% by mol with respect to the total amount of the electron donor compounds.

In a preferred embodiment is used a succinate which is not extractable for more than 15% and another electron donor compound which is extractable for more than 35%.

Among the non-extractable succinates mentioned above, particularly preferred are the succinates of formula (I) below (I)

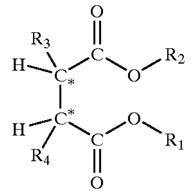

in which C* is an asymetric carbon, the radicals $R_1$ and $R_2$, equal to, or different from each other, are a $C_1$–$C_{20}$ linear or branched alkyl, alkenyl, cycloalkyl, aryl, arylalkyl or alkylaryl group, optionally containing heteroatoms; and the radicals $R_3$ and $R_4$, equal to, or different from each other, are $C_1$–$C_{20}$ alkyl, cycloalkyl, aryl, arylalkyl or alkylaryl group, optionally containing heteroatoms with the proviso that at least one of them is a branched alkyl; said compounds being, with respect to the two asymmetric carbon atoms identified in the structure of formula (I), stereoisomers of the type (S,R) or (R,S) that are present in pure forms or in mixtures.

$R_1$ and $R_2$ are preferably $C_1$–$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

Particularly preferred are the compounds in which the $R_3$ and/or $R_4$ radicals are secondary alkyls like isopropyl, sec-butyl, 2-pentyl, 3-pentyl or cycloakyls like cyclohexyl, cyclopentyl, cyclohexylmethyl.

Examples of the above-mentioned compounds are the (S,R) (S,R) forms pure or in mixture, optionally in racemic form, of diethyl 2,3-bis(trimethylsilyl)succinate, diethyl 2,3-bis(2-ethylbutyl)succinate, diethyl 2,3-dibenzylsuccinate, diethyl 2,3-diisopropylsuccinate, diisobutyl 2,3-diisopropylsuccinate, diethyl 2,3-bis(cyclohexylmethyl) succinate, diethyl 2,3-diisobutylsuccinate, diethyl 2,3-dineopentylsuccinate, diethyl 2,3-dicyclopentylsuccinate, diethyl 2,3-dicyclohexylsuccinate.

Among the extractable electron donor compounds particularly preferred are the esters of mono or dicarboxylic organic acids such as benzoates, malonates, phthalates and succinates. Among malonates particularly preferred are those of formula (II):

(II)

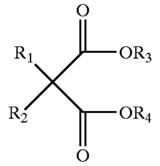

where $R_1$ is H or a $C_1$–$C_{20}$ linear or branched alkyl, alkenyl, cycloalkyl, aryl, arylalkyl or alkylaryl group, $R_2$ is a $C_1$–$C_{20}$ linear or branched alkyl, alkenyl, cycloalkyl, aryl, arylalkyl or alkylaryl group, $R_3$ and $R_4$,equal to, or different from, each other, are $C_1$–$C_{20}$ linear or branched alkyl groups or $C_3$–$C_{20}$ cycloalkyl groups.

Preferably, $R_3$ and R4 are primary, linear or branched $C_1$–$C_{20}$ alkyl groups, more preferably they are primary branched $C_4$–$C_{20}$ alkyl groups such as isobutyl or neopentyl groups.

$R_2$ is preferably, in particular when $R_1$, is H, a linear or branched $C_3$–$C_{20}$ alkyl, cycloalkyl, or arylalkyl group; more preferably $R_2$ is a $C_3$–$C_{20}$ secondary alkyl, cycloalkyl, or arylalkyl group. Preferred esters of aromatic carboxylic acids are selected from $C_1$–$C_{20}$ alkyl or aryl esters of benzoic and phthalic acids, possibly substituted. The alkyl esters of the said acids being preferred. Particularly preferred are the $C_1$–$C_6$ linear or branched alkyl esters. Specific examples are ethylbenzoate, n-butylbenzoate, p-methoxy ethylbenzoate, p-ethoxy ethylbenzoate, isobutylbenzoate, ethyl p-toluate, diethyl phthalate, di-n-propyl phthalate, di-n-butyl phthalate, di-n-pentyl phthalate, di-i-pentyl phthalate, bis(2-ethylhexyl) phthalate, ethyl-isobutyl phthalate, ethyl-n-butyl phthalate, di-n-hexyl phthalate, di-isobutylphthalate.

Among succinates there are many subclasses of compounds that can be used as extractable donors according to the present invention. One of the preferred groups of compounds is that described by the formula (III)

(III)

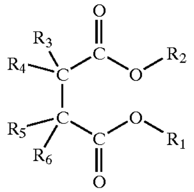

in which $R_3$ to $R_5$ are hydrogen and $R_6$ is a branched alkyl, cycloalkyl, aryl, arylalkyl and alkylaryl radical having from 3 to 10 carbon atoms. Particularly preferred are the compounds in which $R_6$ is a branched primary alkyl group or a cycloalkyl group having from 3 to 10 carbon atoms. Specific examples are diethyl sec-butylsuccinate, diethyl thexylsuccinate, diethyl cyclopropylsuccinate, diethyl norbornylsuccinate, diethyl (10-) perhydronaphthylsuccinate, diethyl trimethylsilylsuccinate, diethyl methoxysuccinate, diethyl p-methoxyphenylsuccinate, diethyl p-chlorophenylsuccinate diethyl phenylsuccinate, diethyl cyclohexylsuccinate, diethyl benzylsuccinate, diethyl (cyclohexylmethyl)succinate, diethyl t-butylsuccinate, diethyl isobutylsuccinate, diethyl isopropylsuccinate, diethyl neopentylsuccinate, Another subclass of preferred compounds is that of formula (III) in which $R_3$ and $R_4$ are hydrogen and $R_5$ and $R_6$ are selected from $C_1$–$C_{20}$ linear or branched alkyl, alkenyl, cycloalkyl, aryl, arylalkyl or alkylaryl group, optionally containing heteroatoms. Specific examples of suitable 2,2-disubstituted succinates are: diethyl 2,2-dimethylsuccinate, diethyl 2-ethyl-2-methylsuccinate, diethyl 2-benzyl-2-isopropylsuccinate, diethyl 2-(cyclohexylmethyl)-2-isobutylsuccinate, diethyl 2-cyclopentyl-2-n-propylsuccinate, diethyl 2,2-diisobutylsuccinate, diethyl 2-cyclohexyl-2-ethylsuccinate, diethyl 2-isopropyl-2-methylsuccinate, diethyl 2,2-diisopropyl diethyl 2-isobutyl-2-ethylsuccinate, diethyl 2-(1,1,1-trifluoro-2-propyl)-2-methylsuccinate, diethyl 2-isopentyl-2-isobutylsuccinate, diethyl 2-phenyl-2-n-butylsuccinate, diisobutyl 2,2-dimethylsuccinate, diisobutyl 2-ethyl-2-methylsuccinate, diisobutyl 2-benzyl-2-isopropylsuccinate, diisobutyl 2-(cyclohexylmethyl)-2-isobutylsuccinate, diisobutyl 2-cyclopentyl-2-n-propylsuccinate.

Moreover, also preferred are the (S,S), (R,R) or meso forms of the succinates of formula (I) described above.

Mixtures of different succinates of formula (I) can be used as non-extractable donors, and mixtures of extractable donors can be used as well. In particular, we found it particularly advantageous the use of the succinates of formula (I) in which $R_3$ and $R_4$ are identical both as extractable and non extractable electron donors. Actually, the compounds of formula (I) in which $R_3$ and $R_4$ are the same are often mixtures of meso (S,S and R,R) and rac-form (S,R and R,S) as a direct result of their preparation process. Therefore, in certain cases the skilled in the art is already provided with a mixture of extractable and non-extractable donors to be used in the preparation of the catalyst of the invention. Depending on the peculiar amounts of the single donors in the mixtures, additional amounts of extractable donors could be requested in order to bring the final composition of the catalyst within the limits set forth above.

It has been found particularly interesting the use of a catalyst component comprising the rac-form of diethyl or diisobutyl 2,3-diisopropylsuccinate as non-extractable donor and the meso form of diethyl or diisobutyl 2,3- diisopropylsuccinate together with an alkylphthalate as extractable donors.

As explained above, the catalyst components of the invention comprise, in addition to the above electron donors, Ti, Mg and halogen. In particular, the catalyst components comprise a titanium compound, having at least a Ti-halogen bond and the above mentioned electron donor compounds supported on a Mg halide. The magnesium halide is preferably $MgCl_2$ in active form which is widely known from the patent literature as a support for Ziegler-Natta catalysts. Patents U.S. Pat. No. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line. The preferred titanium compounds used in the catalyst component of the present invention are $TiCl_4$ and $TiCl_3$; furthermore, also Ti-haloalcoholates of formula $Ti(OR)_{n-y}X_y$ can be used, where n is the valence of titanium, y is a number between 1 and n-1 X is halogen and R is a hydrocarbon radical having from 1 to 10 carbon atoms.

The preparation of the solid catalyst component can be carried out according to several methods. According to one of these methods, the magnesium dichloride in an anhydrous state, the titanium compound and the electron donor compounds are milled together under conditions in which activation of the magnesium dichloride occurs. The so obtained product can be treated one or more times with an excess of $TiCl_4$ at a temperature between 80 and 135° C. This treatment is followed by washings with hydrocarbon solvents until chloride ions disappeared. According to a further method, the product obtained by co-milling the magnesium chloride in an anhydrous state, the titanium compound and the electron donor compounds are treated with halogenated hydrocarbons such as 1,2-dichloroethane, chlorobenzene, dichloromethane etc. The treatment is carried out for a time between 1 and 4 hours and at temperature of from 40° C. to the boiling point of the halogenated hydrocarbon. The product obtained is then generally washed with inert hydrocarbon solvents such as hexane.

According to another method, magnesium dichloride is preactivated according to well known methods and then treated with an excess of $TiCl_4$ at a temperature of about 80 to 135° C. in the presence of the electron donor compounds. The treatment with $TiCl_4$ is repeated and the solid is washed with hexane in order to eliminate any non-reacted $TiCl_4$.

A further method comprises the reaction between magnesium alcoholates or chloroalcoholates (in particular chloroalcoholates prepared according to U.S. Pat. No. 4,220,554) and an excess of $TiCl_4$ in the presence of the electron donor compounds at a temperature of about 80 to 120° C.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2pROH$, where p is a number between 0.1 and 6, preferably from 2 to 3.5, and R is a hydrocarbon radical having 1–18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100–130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The so obtained adduct can be directly reacted with Ti compound or it can be previously subjected to thermal controlled dealcoholation (80–130° C.) so as to obtain an adduct in which the number of moles of alcohol is generally lower than 3 preferably between 0.1 and 2.5. The reaction with the Ti compound can be carried out by suspending the adduct (dealcoholated or as such) in cold $TiCl_4$ (generally 0° C.); the mixture is heated up to 80–130° C. and kept at this temperature for 0.5–2 hours. The treatment with $TiCl_4$ can be carried out one or more times. The electron donor compounds can be added during the treatment with $TiCl_4$. They can be added together in the same treatment with $TiCl_4$ or separately in two or more treatments.

The preparation of catalyst components in spherical form is described for example in European Patent Applications EP-A-395083, EP-A-553805, EP-A-553806, EPA-601525 and W098/44009.

The solid catalyst components obtained according to the above method show a surface area (by B.E.T. method) generally between 20 and 500 $m^2/g$ and preferably between 50 and 400 $m^2/g$, and a total porosity (by B.E.T. method) higher than 0.2 $cm^3/g$ preferably between 0.2 and 0.6 $cm^3/g$. The porosity (Hg method) due to pores with radius up to 10000 Å generally ranges from 0.3 to 1.5 $cm^3/g$, preferably from 0.45 to 1 $cm^3/g$.

A further method to prepare the solid catalyst component of the invention comprises halogenating magnesium dihydrocarbyloxide compounds, such as magnesium dialkoxide or diaryloxide, with solution of $TiCl_4$ in aromatic hydrocarbon (such as toluene, xylene etc.) at temperatures between 80 and 130° C. The treatment with $TiCl_4$ in aromatic hydrocarbon solution can be repeated one or more times, and the electron donor compounds are added during one or more of these treatments.

In any of these preparation methods the desired electron donor compounds and in particular those selected from esters of carboxylic acids, can be added as such or, in an alternative way, it can be obtained in situ by using an appropriate precursor capable to be transformed in the desired electron donor compound by means, for example, of known chemical reactions such as esterification, transesterification, etc.

Regardless to the preparation method used, the final amount of the two or more electron donor compounds is such that the molar ratio with respect to the $MgCl_2$ is from 0.01 to 1, preferably from 0.05 to 0.5.

The solid catalyst components according to the present invention are converted into catalysts for the polymerization of olefins by reacting them with organoaluminum compounds according to known methods.

In particular, it is an object of the present invention a catalyst for the polymerization of olefins $CH_2{=}CHR$, in which R is hydrogen or a hydrocarbyl radical with 1–12 carbon atoms, comprising the product of the reaction between:

(i) the solid catalyst component as disclosed above, (ii) an organo-metal compound and (iii) an external electron donor compound.

The organo-metal compound (ii) is preferably chosen among alkyl-Al compounds and in particular among the trialkyl aluminum compounds such as for example triethylaluminum, triisobutylaluminum, tri-n- butylaluminum, tri-n-hexylaluminum, tri-n-octylaluminum. It is also possible to use alkylaluminum halides, alkylaluminum hydrides or alkylaluminum sesquichlorides, such as $AlEt_2Cl$ and $Al_2Et_3Cl_3$, possibly in mixture with the above cited trialkylaluminums.

Suitable external electron-donor (iii) include silanes, ethers, esters, amines, heterocyclic compounds and ketones. A particular class of preferred external donor compounds is that of silanes of formula $R_a^5R_b^6Si(OR^7)_c$, where a and b are integers from 0 to 2, c is an integer from 1 to 4 and the sum (a+b+c) is 4; $R^5$, $R^6$, and $R^7$, are alkyl, alkylen, cycloalkyl or aryl radicals with 1–18 carbon atoms optionally containing heteroatoms. Particularly preferred are the silicon compounds in which a is 1, b is 1, c is 2, at least one of $R^5$ and $R^6$ is selected from branched alkyl, cycloalkyl or aryl groups with 3–10 carbon atoms optionally containing heteroatoms and $R^7$ is a $C_1$–$C_{10}$ alkyl group, in particular methyl. Examples of such preferred silicon compounds are methylcyclohexyldimethoxysilane, dicyclopentyldimethoxysilane.

Although the above disclosed catalyst are able to give propylene polymers with high xylene insolubility, high stereoblock content and broad MWD it has been found that polymers with particularly increased stereoblock content and broad MWD are obtainable using as external donors certain silanes of the above disclosed formula having a relatively low stereoregulating ability. By the term "low stereoregulating ability" we mean silanes that under the standard polymerization conditions described below give propylene polymers with a content of pentads (mmmm) equal to or lower than 97%. The skilled in the art can easily determine the stereoregulating ability of the relevant silanes by performing the polymerization test under the conditions described below. In addition, the applicant found that a group of silanes with a low stereoregulating ability are those of the formula disclosed above in which $R^5$ is methyl, $R^6$ is a C1–C15 linear alkyl and $R^7$ is a linear C1–C4 alkyl. Preferred examples of these silanes are n-propyl-methyl-dimethoxysilane; n- butyl-methyl-dimethoxysilane; n-pentyl-methyl-dimethoxysilane; n-hexyl-methyl-dimethoxysilane; n-octyl-methyl-dimethoxysilane; n-decyl-methyl-dimethoxysilane. A further group of silanes with low stereoregulating ability is that of the formula above described in which c is 3 or 4. Particularly preferred are the alkyltrialkoxysilanes and the tetraalkoxysilanes in which $R^7$ is a linear C1–C8 alkyl.

Another group of silanes with a low stereoregulating ability are those of the formula disclosed above in which $R^5$ is a trifluropropyl group, optionally subustituted, $R^6$ is a C1–C6 linear alkyl or a piperidinyl group, optionally substituted, and $R^7$ is a linear C1–C4 alkyl. Preferred examples of these silanes are (3,3,3-trifluoro-n-propyl)(2-ethylpiperidinyl)dimethoxysilane, methyl(3,3,3-trifluoro-n-propyl)dimethoxysilane.

The electron donor compound (iii) is used in such an amount to give a molar ratio between the organoaluminum compound and said electron donor compound (iii) of from 0.1 to 500, preferably from 1 to 300 and more preferably from 3 to 100.

The polymerization process can be carried out according to known techniques for example slurry polymerization using as diluent an inert hydrocarbon solvent, or bulk polymerization using the liquid monomer (for example propylene) as a reaction medium. Moreover, it is possible to carry out the polymerization process in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.5 and 5 MPa, preferably between 1 and 4 MPa. In the bulk polymerization the operating pressure is generally between 1 and 8 MPa preferably between 1.5 and 5 MPa.

As explained above, the catalysts of the invention when used in the polymerization of propylene are able to give polymers with a range of isotacticity (expressed in term of percentage of mmmm pentads), MWD and stereoblock content such that they are particularly suitable for use in the BOPP field. It is particular worth noting that the high values of P.I. are obtained in a single polymerization step i.e., with a substantially monomodal distribution which allow to avoid any problem due to non homogeneity of the product.

Therefore, it constitutes a further object of the present invention a propylene polymer having the following characteristics:

- a stereoblock content of 18% or higher measured by the TREF method described below;
- a Polydispersity Index of at least 5 and
- a percentage of pentads (mmmm), measured by NMR, lower than or equal to 97.

Preferably the stereoblock content is higher than 20 and more preferably higher than 22. The P.I. is preferably higher than 5.3 and the percentage of pentads is preferably lower than 96.5 and more preferably lower than 95.5. It has moreover been found that particularly interesting polypropylenes are those disclosed above and further characterized by a showing, at the TREF analysis, a fraction eluted at a temperature ranging from 110° and 114° C. which accounts for more than 25% of the total weight of the polymer. Preferably it accounts for more than 33%. Also preferred are the polypropylenes with a TREF profile such that the fraction eluted at a temperature between 115° and 120° C. accounts for a value between 0.1 and 10%, preferably between 0.5 and 5%, of the total weight of the polymer.

Characterizations

Test for the Extractability of the Electron Donor (ED) Compounds

A. Preparation of the Solid Catalyst Component

Into a 500 ml four-necked round flask, purged with nitrogen, 250 ml of $TiCl_4$ were introduced at 0° C. While stirring, 10.0 g of microspheroidal $MgCl_2$*$2.8C_2H_5OH$ (prepared according to the method described in ex.2 of U.S. Pat. No. 4,399,054 but operating at 3,000 rpm instead of 10,000) were introduced. 4.4 mMols of the selected electron donor compound were also added.

The temperature was raised to 100 ° C. and maintained at that temperature for 120 min. Then, the stirring was discontinued, the solid product was allowed to settle and the supernatant liquid was siphoned off.

250 ml of fresh $TiCl_4$ were added. The mixture was reacted at 120° C. for 60 min under stirring and, then, the supernatant liquid was siphoned off. The solid (A) was washed six times with anhydrous hexane (6×100 ml) at 60° C., dried under vacuum and analyzed for the quantitative determination of Mg and electron donor compound. The type of electron donor compound and its molar ratio with respect to Mg (ratio A) are reported in Table 1.

B. Treatment of Solid A

In a 250 ml jacketed glass reactor with mechanical stirrer and filtration septum are introduced under nitrogen atmosphere 190 ml of anhydrous n-hexane, 19 mMmoles of $AlEt_3$ and 2 gr of the catalyst component prepared as described in A. The mixture is heated at 60° C. for 1 hour under stirring (stirring speed at 400 rpm). After that time the mixture is filtered, washed four times with n-hexane at 60° C. and finally dried under vacuum for 4 hours at 30° C. The solid is then analyzed for the quantitative determination of Mg and electron donor compound. The type of electron donor compound and its molar ratio with respect to Mg (ratio B) are reported in Table 1. The extractability of the electron donor compound is calculated according to the following formula: % of ED extracted =(Ratio A-Ratio B)/Ratio A *100.

Polymer Microstructure Analysis 50 mg of each xylene insoluble fraction were dissolved in 0.5 ml of $C_2D_2Cl_4$. The $^{13}C$ NMR spectra were acquired on a Bruker DPX-400 (100.61 Mhz, 90° pulse, 12 s delay between pulses). About 3000 transients were stored for each spectrum; mmmm pentad peak (21.8 ppm) was used as reference.

The microstructure analysis was carried out as described in literature (*Polymer*, 1984, 25, 1640, by Inoue *Y. et Al. and Polymer*, 1994, 35, 339, by Chujo R. et Al.).

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

TREF Method

TREF fractionation of the polymer was carried out by dissolving 1 g of propylene polymer in o-xylene at 135° C. and slowly cooling (20 h) to 25° C. in a column loaded with glass beads. Elution with o-xylene (600 mL/h) was first carried out at 25° C. for 1 h to obtain a xylene-soluble fraction. The column temperature was then raised from 25 to 95° C. at a rate of 0.7° C./min without elution and the temperature was held at 95° C. for 2 h before eluting at this temperature for 1 h to yield a single fraction. Finally, elution was continued while raising the temperature from 95 to 120° C. at a rate of 3° C./h, collecting individual fractions at temperature intervals of 1° C. According to the present invention the stereoblock content is considered as the total weight of the fractions, insoluble in xylene at 25° C., that are eluted at a temperature lower than 100° C. based on the total weight of the polymer.

Determination of Polydispersity Index (P.I.)

This property is strictly connected with the molecular weight distribution of the polymer under examination. In particular it is inversely proportional to the creep resistance of the polymer in the molten state. Said resistance called modulus separation at low modulus value (500 Pa), was determined at a temperature of 200° C. by using a parallel plates rheometer model RMS-800 marketed by RHEOMETRICS (U.S.A.), operating at an oscillation frequency which increases from 0.1 rad/sec to 100 rad/sec. From the modulus separation value, one can derive the P.I. by way of the equation:

$$P.I.=54.6*(\text{modulus separation})^{-1.76}$$

in which the modulus separation is defined as:

$$\text{modulus separation}=\text{frequency at } G'=500\ \text{Pa}/\text{frequency at } G''=500\ \text{Pa}$$

wherein G' is storage modulus and G" is the loss modulus.

Standard Test of Polymerization for Evaluation of Silane Stereocontrol

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2*2.8C_2H_5OH$ (prepared according to the method described in ex.2 of U.S. Pat. No. 4,399,054 but operating at 3000 rpm instead of 10000 rpm) and 10.1 mMol of diisobutylphthalate are added. The temperature was raised to 100° C. and maintained for 120 min. Then, the stirring was discontinued, the solid product was allowed to settle and the supernatant liquid was siphoned off. Then 250 mL of fresh $TiCl_4$ were added. The mixture was reacted at 120 C. for 60 min and, then, the supernatant liquid was siphoned off. The solid was washed six times with anhydrous hexane (6×100 mL) at 60° C. Finally, the solid was dried under vacuum.

In a 4 liter autoclave, purged with nitrogen flow at 70° C. for one our, are introduced in propylene flow at 30° C. 75 mL of anhydrous hexane containing 800 mg of $AlEt_3$, an amount of silane such as to provide an Al/Si ratio of 20 and 10 mg of a solid catalyst component prepared as described above. The autoclave was closed. 1.5 NL of hydrogen were added and then, under stirring, 1.2 kg of liquid propene were fed. The temperature was raised to 70° C. in five minutes and the polymerization was carried out at this temperature for two hours. The nonreacted propylene was removed, the polymer was collected, dried at 70° C. under vacuum for three hours, weighed, and subject to xylene insolubility determination. The insoluble portion is analyzed to determine the percentage of pentads (mmmm) according to the method described above.

Examples 1–4 and Comparative Examples 1–3

Preparation of Solid Catalyst Components

Into a 500 ml four-necked round flask, purged with nitrogen, 250 ml of $TiCl_4$ were introduced at 0° C. While stirring, 10.0 g of microspheroidal $MgCl_2*2.8C_2H_5OH$ (prepared according to the method described in ex.2 of U.S. Pat. No. 4,399,054 but operating at 3,000 rpm instead of 10,000) were introduced. As internal donor(s), 7.6 mMols of a previously prepared mixture of esters were also added. Type(s) of internal donors and amounts are reported in Table 2.

The temperature was raised to 100° C. and maintained for 120 min. Then, the stirring was discontinued, the solid product was allowed to settle and the supernatant liquid was siphoned off.

250 ml of fresh $TiCl_4$ were added. The mixture was reacted at 120° C. for 60 min and, then, the supernatant liquid was siphoned off. The solid was washed six times with anhydrous hexane (6×100 ml) at 60° C. Finally, the solid was dried under vacuum and analyzed. The types and amounts of esters (wt %) and the amount of Ti (wt %) contained in the solid catalyst component are reported in Table 2.

Polymerization Examples 5–17 and Comparative Examples C4–C10

In a 4 liter autoclave, purged with nitrogen flow at 70° C. for one our, 75 ml of anhydrous hexane containing 7 mMols of $AlEt_3$, the external donor (type and amount are reported in the Table 3) and 10 mg of solid catalyst component were introduced in propylene flow at 30° C. The autoclave was closed, 1.5 Nl of hyrogen were added and then, under stirring, 1.2 Kg of liquid propylene were fed. The temperature was rised to 70° C. in five minutes and the polymerization was carried out at this temperature for two hours. The unreacted propylene was vented, the polymer was recovered and dried at 70° C. under vacuum for three hours and, then, weighed and fractionated with o-xylene to determine the amount of the xylene insoluble (X.I.) fraction at 25° C. and its microstructure.

Polymerization results are reported in Table 3.

TABLE 1

| | ED | | |
|---|---|---|---|
| | ED/Mg ratio A<br>Type | ED/Mg ratio B<br>(mMols/gram atom) | ED extracted<br>(mMols/gram atom) (mol %) |
| rac Diethyl 2,3-diisopropylsuccinate | 65.2 | 62.8 | 4 |
| Meso Diethyl 2,3-diisopropylsuccinate | 39.3 | 23.9 | 39 |
| Diisobutyl phthalate | 48.8 | 8.8 | 82 |

TABLE 2

| Preparation conditions | | | | | Composition | | | | | |
|---|---|---|---|---|---|---|---|---|---|---|
| | Fed in the preparation | | | | | not | | | | |
| Ex. | Not extractable succinate | | Extractable ED | | Ti | extractable succinate | | Extract-able ED | | % of not extractable succinate on total I.D. |
| No | Type | MMols | Type(s) | Mmols | Wt % | Type | Wt % | Type | Wt % | Mols %. |
| 1 | A | 0.76 | B | 6.84 | 3.3 | A | 2.4 | B | 7.6 | 24 |
| 2 | A | 1.14 | B | 6.46 | 3.8 | A | 3.24 | B | 7.56 | 30 |
| 3 | A | 1.67 | B | 1.37 | 4.2 | A | 3.53 | B | 1.17 | 30 |
| | | | DIBP | 4.56 | | | | DIBP | 7.6 | |
| 4 | C | 1.25 | D | 1.79 | 3.4 | C | 4.4 | D | 1.46 | 33 |
| | | | DIBP | 4.56 | | | | DIBP | 6.6 | |
| C1 | — | — | B | 7.6 | 3.8 | — | | B | 10.7 | — |
| C2 | A | 2.8 | B | 4.8 | 3.5 | A | 7.75 | B | 7.45 | 51 |
| C3 | — | — | DIBP | 7.6 | 2.5 | — | | DIBP | 7.1 | — |

A = rac Diethyl 2,3-diisopropylsuccinate
B = meso Diethyl 2,3-diisopropylsuccinate
C = rac Diisobutyl 2,3-diisopropylsuccinate
D = meso Diisobutyl 2,3-diisopropylsuccinate
DIBP = Diisobutylphthalate

TABLE 3

| Polym. Example | Catalyst Ex. | Ext. Donor | Ext. Donor Amount | Activity | X.I. | | Pentads (mmmm) | TREF | |
|---|---|---|---|---|---|---|---|---|---|
| No | No | Type | Mmols | Kg/g | % | P.I | % | % wt 25–99° C. | % wt 110–114° C. |
| 5 | 1 | G | 0.35 | 33 | 94.3 | 5.8 | 93.2 | | |
| 6 | 2 | G | 0.35 | 43 | 95.8 | 5.9 | 94.8 | 20.1 | 34.1 |
| 7 | 3 | G | 0.35 | 45 | 97.2 | 5.3 | 95 | | |
| 8 | 3 | G | 0.18 | 48 | 96.1 | 5.2 | 94.5 | 20.3 | 40.9 |
| 9 | 3 | H | 0.35 | 47 | 94.4 | 5.3 | 94.1 | 27.2 | 28.4 |
| 10 | 3 | I | 0.35 | 29 | 97 | 5.4 | 96.3 | | |
| 11 | 3 | I | 0.18 | 36 | 94.5 | 5.6 | 95.2 | | |
| 12 | 3 | J | 0.35 | 21 | 97.1 | 5.5 | 96.1 | 19.3 | 52.5 |
| 13 | 3 | J | 0.18 | 26 | 96.1 | 5.8 | 96.2 | | |
| 14 | 3 | K | 0.35 | 25 | 96 | 5.5 | 96.5 | | |
| 15 | 3 | K | 0.18 | 31 | 95.4 | 6.1 | 96.3 | 21.4 | 47.6 |
| 16 | 3 | L | 0.35 | 50 | 97.8 | 5 | 97.3 | | |
| 17 | 4 | G | 0.35 | 66 | 96.9 | 5.1 | 95.2 | | |
| C4 | C1 | G | 0.35 | 41 | 92.5 | 4.3 | — | | |
| C5 | C2 | G | 0.35 | 65 | 96.8 | 6.1 | 96.3 | | |
| C6 | C3 | G | 0.35 | 39 | 94.2 | 3.5 | 94.2 | | |
| C7 | C3 | H | 0.35 | 34 | 94.0 | 4.1 | | | |
| C8 | C3 | I | 0.35 | 15 | 95.9 | 3.9 | 93.8 | | |
| C9 | C3 | J | 0.35 | 19 | 90.8 | 4.2 | 93.1 | | |
| C10 | C3 | K | 0.35 | 28 | 95.7 | 4.3 | 95.9 | | |

G = Trifluoropropylmethyldimethoxysilane
H = Octylmethyldimethoxysilane
I = Methyl trimethoxysilane
J = Tetramethoxysilane
K = Tetraethoxysilane
L = Cyclohexylmethyl dimethoxysilane

What is claimed is:

1. Catalyst components for the polymerization of olefins $CH_2$=CHR in which R is hydrogen or a hydrocarbyl radical with 1–12 carbon atoms, comprising Mg, Ti, halogen and at least two electron donor compounds, wherein at least one of the electron donor compounds, which is present in an amount from 15 to 50% by mol with respect to the total amount of donors, is a non-extractable succinate selected from esters of succinic acids which are not extractable for more than 20% by mol; and at least one extractable electron donor compound which is extractable for more than 30% by mol.

2. The catalyst components according to claim 1 wherein the amount of non-extractable succinate is between 20 and 40% by mol based on the total amount of electron donor compounds present on the catalyst.

3. The catalyst components according to claim 1 wherein the non-extractable succinate is extractable for not more than 15% by mol.

4. The catalyst components according to claim 1 wherein the extractable electron donor compound is extractable for more than 40% by mol.

5. The catalyst components according to claim 1 wherein the non-extractable succinates are those of formula (I)

(I)

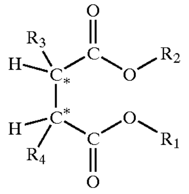

in which C* is an asymmetric carbon, the radicals $R_1$ and $R_2$, equal to, or different from each other, are a $C_1$–$C_{20}$ linear or branched alkyl, alkenyl, cycloalkyl, aryl, arylalkyl or alkylaryl group, optionally containing heteroatoms; and the radicals $R_3$ and $R_4$, equal to, or different from each other, are $C_1$–$C_2$ alkyl, cycloalkyl, aryl, arylalkyl or alkylaryl group, optionally containing heteroatoms with the proviso that at least one of $R_3$ and $R_4$ is a branched alkyl, said non extractable succinates of formula (I) being, with respect to the two asymmetric carbon atoms, stereoisomers of the type (S,R) or (R,S) that are present in pure forms or in mixtures.

6. The catalyst components according to claim 1 in which the extractable electron donor compound is selected from esters of phthalic acids.

7. The catalyst components according to claim 1 in which the extractable electron donor compound is selected from alkyl esters of phthalic acids.

8. The catalyst components according to claim 5 in which the extractable electron donor compound is selected from the (S,S), (R,R) or meso forms of the succinates of formula (I).

9. The catalyst components according to claim 8 further comprising alkyl esters of phthalic acids as extractable donors.

10. The catalyst components according to claim 1 comprising a titanium compound having at least one Ti-halogen bond supported on a Mg dichloride.

11. The catalyst components according to claim 10 having a surface area (by B.E.T. method) between 20 and 500 $m^2/g$ and a total porosity (by B.E.T. method) higher than 0.2 $cm^3/g$.

12. A catalyst for the polymerization of olefins comprising (i) a solid catalyst component comprising Mg, Ti, halogen and at least two electron donor compounds, wherein at least one of the electron donor compounds, which is present in an amount from 15 to 50% by mol with respect to the total amount of donors, is a non-extractable succinate selected from esters of succinic acids which are not extractable for more than 20% by mol; and at least one extractable electron donor compound which is extractable for more than 30% by mol;

(ii) an organo-metal compound; and (iii) an external electron donor compound.

13. The catalyst according to claim 12 in which the organo-metal compound is an alkyl-Al compound.

14. The catalyst according to claim 12 in which the external electron compound is selected from silanes of formula $R_a^5R_b^6Si(OR)_c$, where a and b are integers from 0 to 2, c is an integer from 1 to 4 and the sum (a+b+c) is 4; $R^5$, $R^6$, and $R^7$, are alkyl, alkylen, cycloalkyl or aryl radicals with 1–18 carbon atoms optionally containing heteroatoms.

15. The catalyst according to claim 14 in which the silane is selected from those having a low stereoregulating ability.

16. The catalyst according to claim 14 in which the silane is selected from those in which $R^5$ is methyl, $R^6$ is a C1–C15 linear alkyl and $R^7$ is a linear C1–C4 alkyl.

17. The catalyst according to claim 14 in which the silane is selected from those in which $R^5$ is a trifluropropyl group, optionally substituted, $R^6$ is a C1–C6 linear alkyl or a piperidinyl group, optionally substituted, and $R^7$ is a linear C1–C4 alkyl.

18. The catalyst according to claim 14 in which the silane is selected from those in which c is 3 or 4.

19. A process for the preparation of propylene polymers wherein the polymerization is carried out in the presence of a catalyst comprising:

(i) a solid catalyst component comprising Mg, Ti, halogen and at least two electron donor compounds, wherein at least one of the electron donor compounds, which is present in an amount from 15 to 50% by mol with respect to the total amount of donors, is a non-extractable succinate selected from esters of succinic acids which are not extractable for more than 20% by mol; and at least one extractable electron donor compound which is extractable for more than 30% by mol;

(ii) an alkyl-Al compound; and (iii) an external electron donor compound.

* * * * *

UNITED STATES PATENT AND TRADEMARK OFFICE

CERTIFICATE OF CORRECTION

PATENT NO. : 6,825,309 B2 — Page 1 of 1
APPLICATION NO. : 10/149306
DATED : November 30, 2004
INVENTOR(S) : Giampiero Morini et al.

It is certified that error appears in the above-identified patent and that said Letters Patent is hereby corrected as shown below:

At col. 13, line 39, claim 5, line 6, change "$C_1$-$C_2$" to --$C_1$-$C_{20}$--.

Signed and Sealed this

Second Day of September, 2008

Jon W. Dudas

JON W. DUDAS
*Director of the United States Patent and Trademark Office*

UNITED STATES PATENT AND TRADEMARK OFFICE

CERTIFICATE OF CORRECTION

PATENT NO. : 6,825,309 B2
APPLICATION NO. : 10/149306
DATED : November 30, 2004
INVENTOR(S) : Giampiero Morini et al.

It is certified that error appears in the above-identified patent and that said Letters Patent is hereby corrected as shown below:

On the title page item (30) Foreign Application Priority Data:

delete "Jan. 13, 2000" and insert instead --October 13, 2000-- [per the Declaration for Utility or Design Patent Application filed June 10, 2002, as well as the corresponding WO publication (WO 02/30998)].

Signed and Sealed this

Sixteenth Day of September, 2008

JON W. DUDAS
*Director of the United States Patent and Trademark Office*